United States Patent Office 3,389,594
Patented June 25, 1968

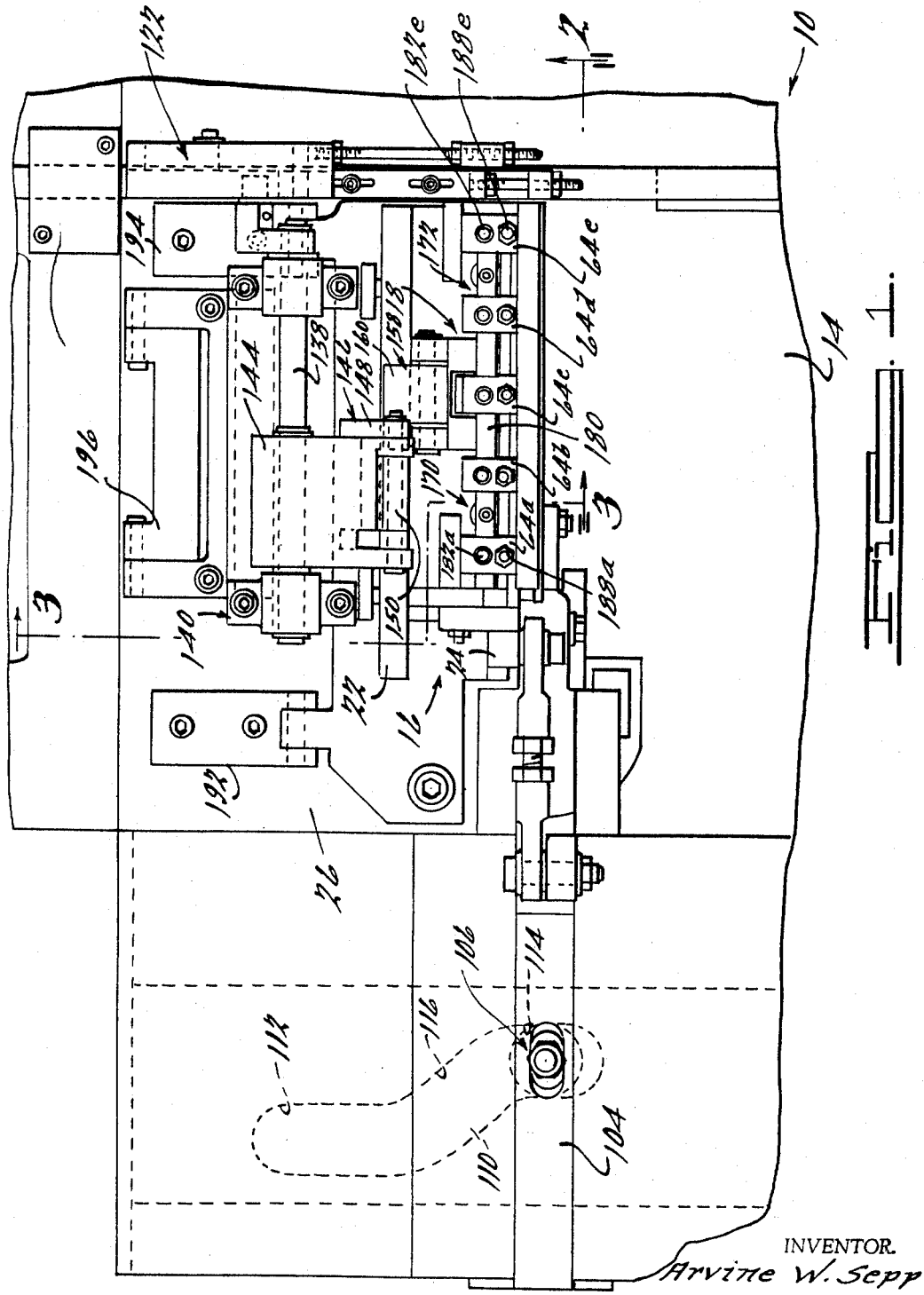

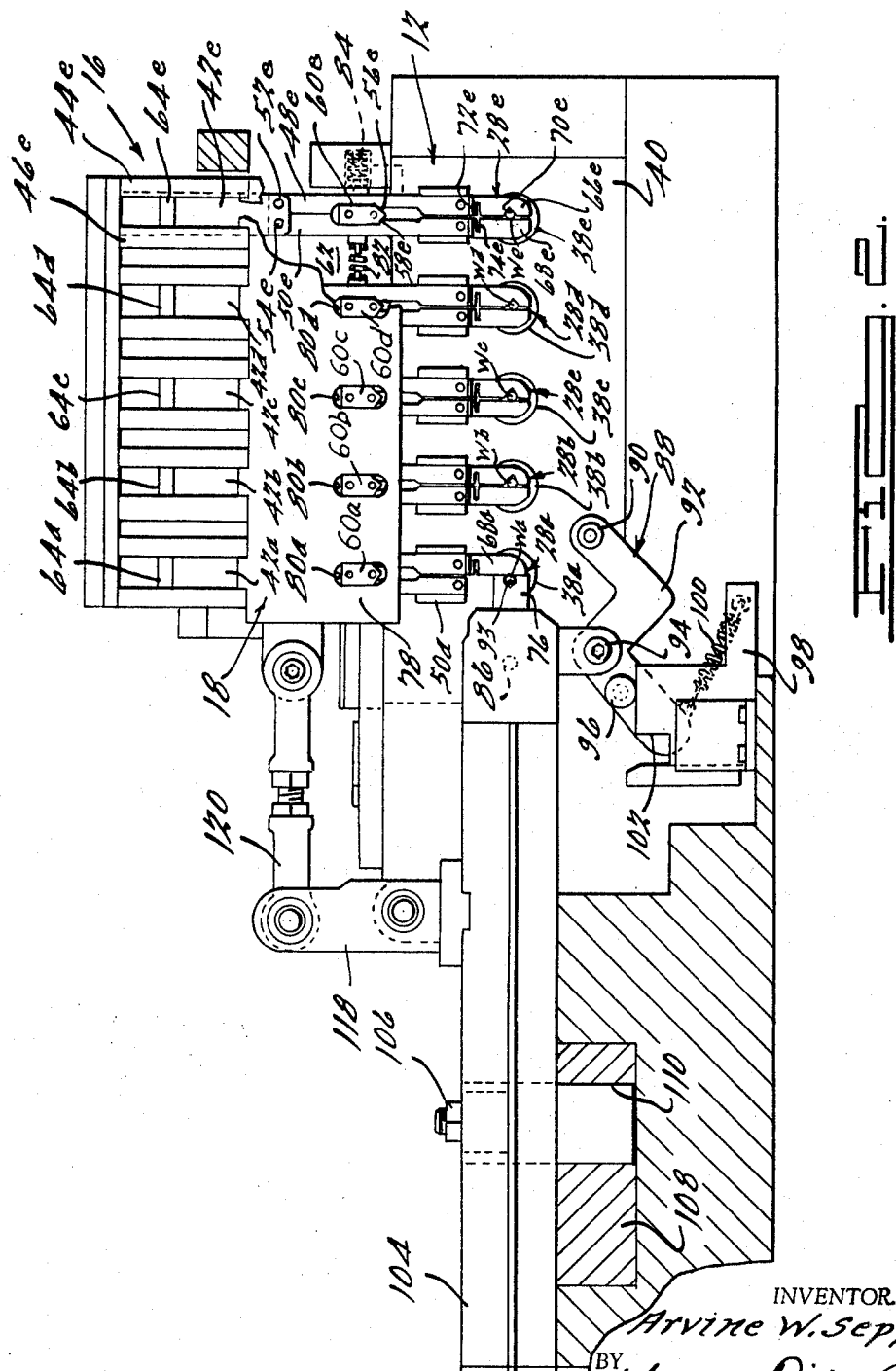

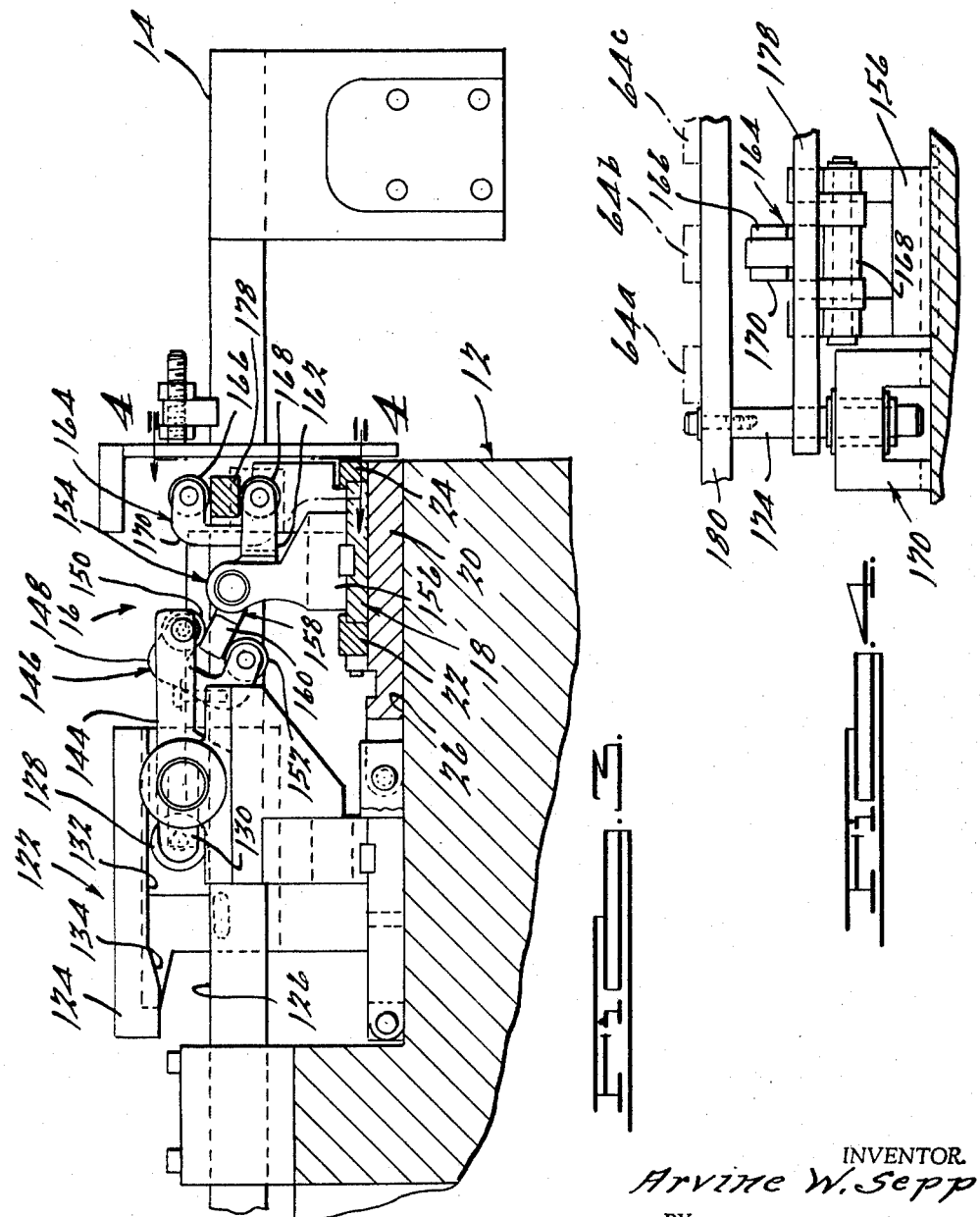

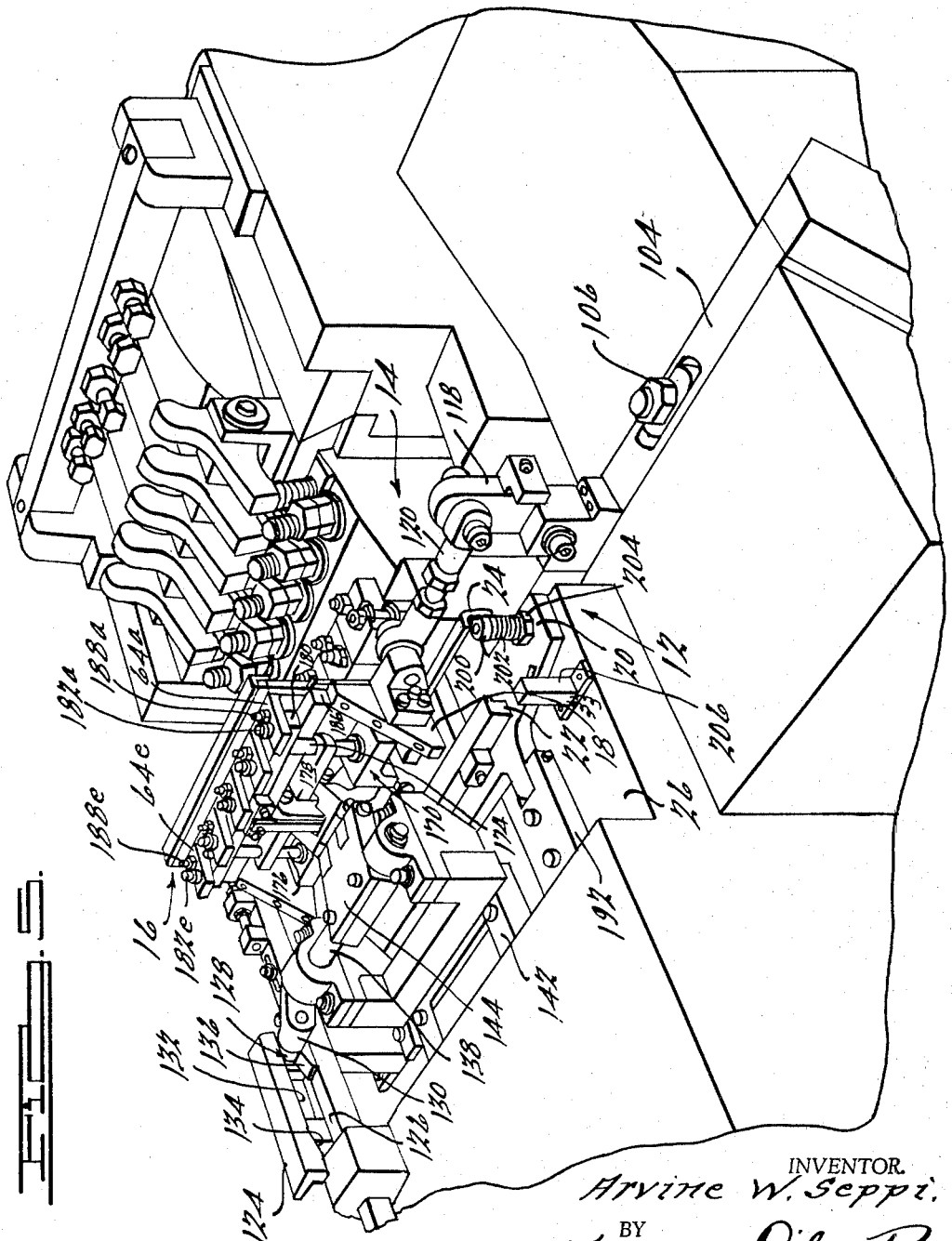

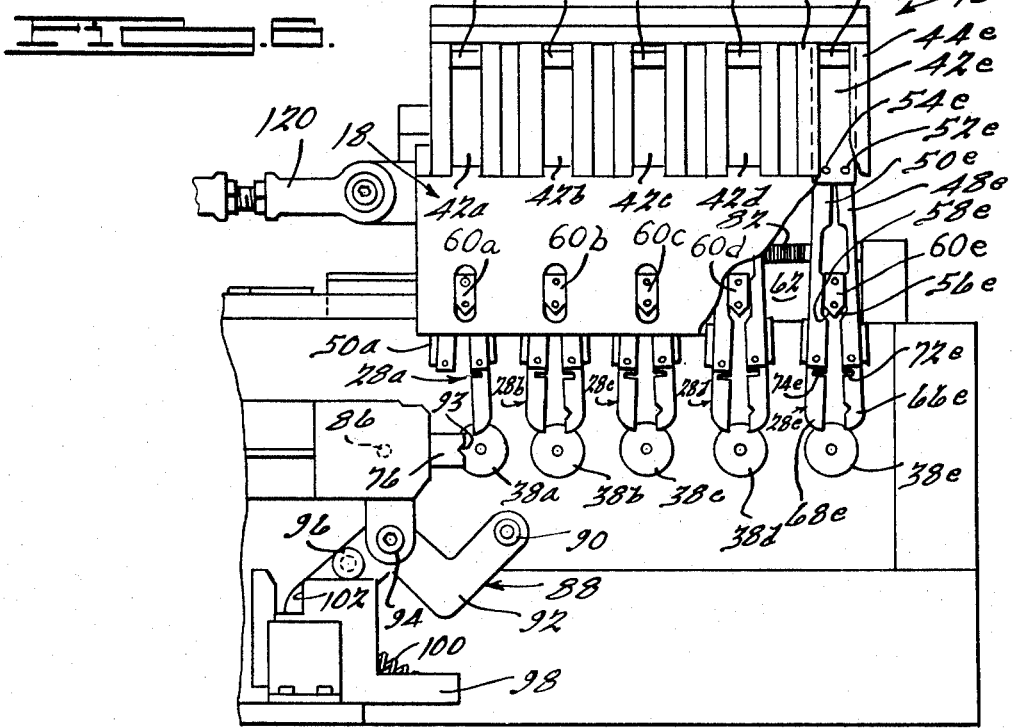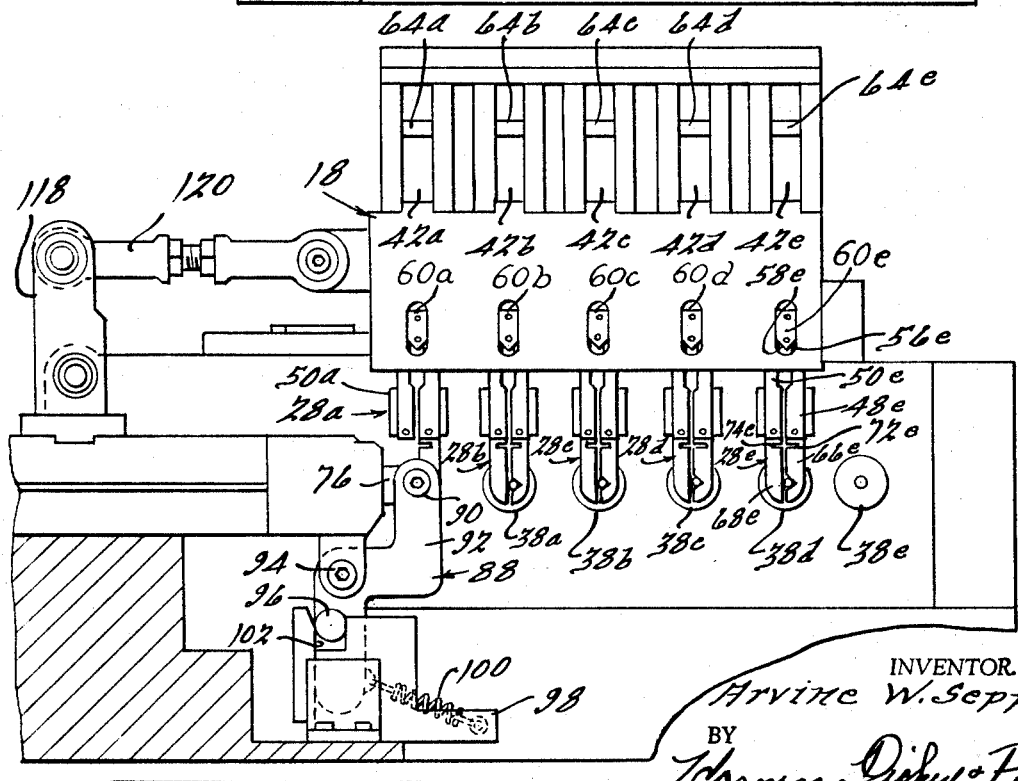

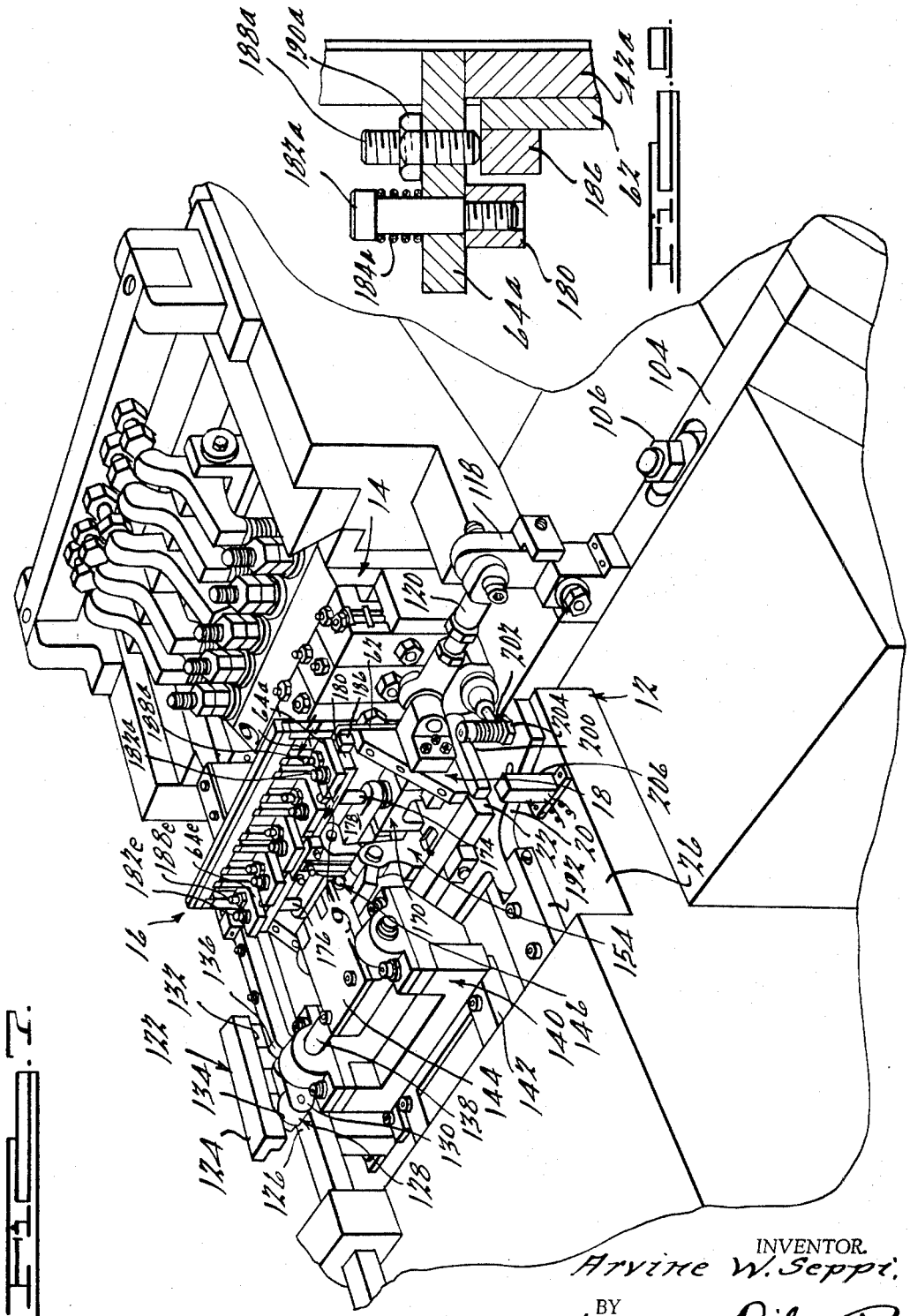

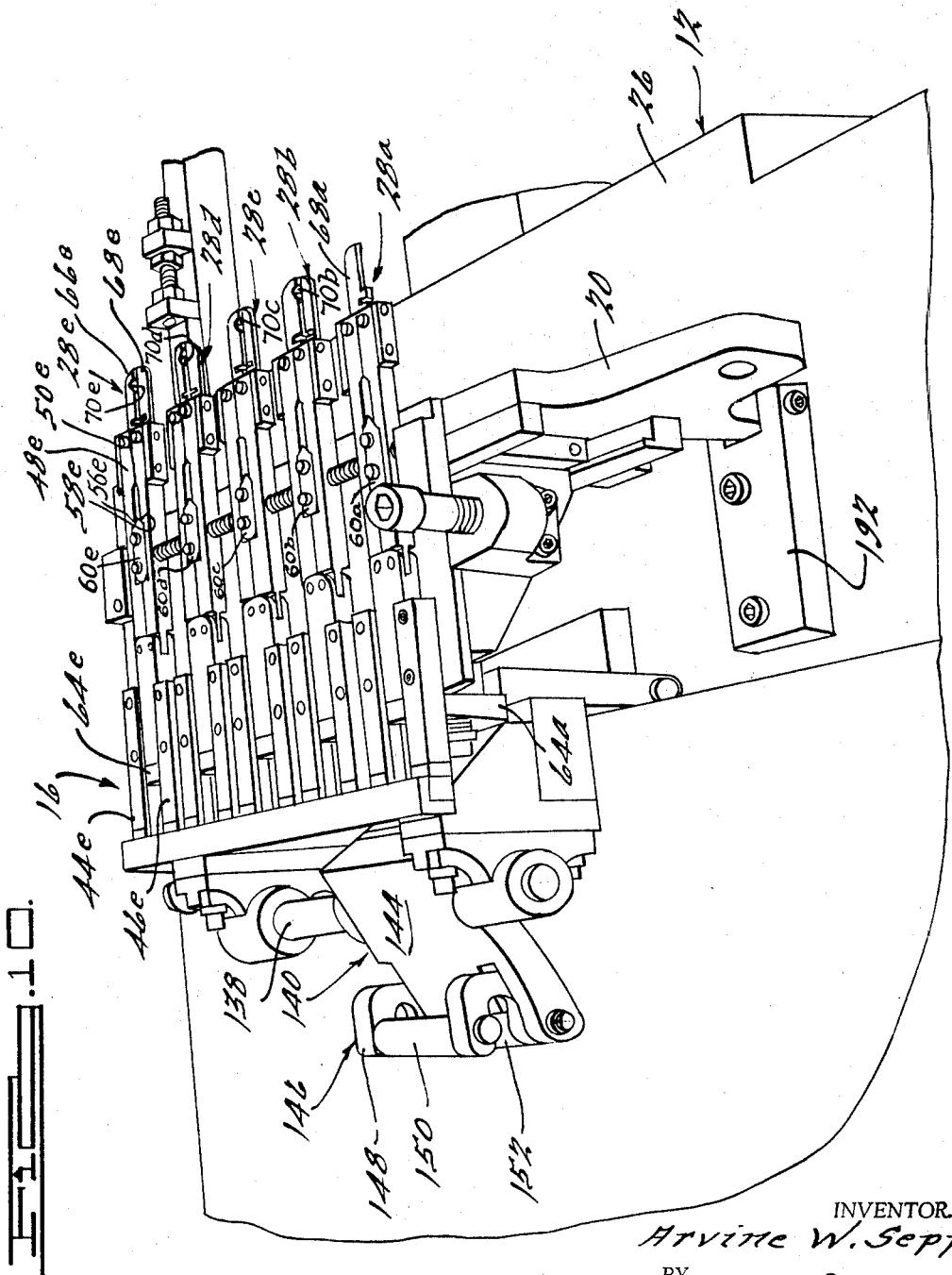

3,389,594
MULTIPLE STATION TRANSFER DEVICE
Arvine W. Seppi, St. Clair Shores, Mich., assignor to Huck Manufacturing Company, Detroit, Mich., a corporation of Michigan
Filed Dec. 2, 1964, Ser. No. 415,441
15 Claims. (Cl. 72—419)

This invention relates to a multiple station transfer device, and more specifically to a multiple station transfer device for use with metal working apparatus such as progressive headers.

It is a general object of the present invention to provide a transfer mechanism having a novel construction for use in transferring parts, for example, from one station of a multiple station header to another.

The transfer mechanism of the present invention is constructed to facilitate adjustment and repair whereby downtime is reduced. Therefore, it is another object of this invention to provide a novel transfer mechanism which is of a construction permitting quick and easy repair and replacement of parts.

In use with a multiple stage header, oftentimes transfer mechanism of past constructions permit only a limited clearance for the heading dies and hence limit the size of the heading apparatus which can conceivably be used at a particular stage or station. In the present invention the transfer mechanism has a novel construction whereby the clearance problems are eliminated and the size of the heading die to be utilized is in no way restricted by the transfer mechanism.

Therefore, it is another object of the present invention to provide a novel transfer mechanism for use with a multiple stage header in which clearance problems between the dies and the transfer mechanism are eliminated.

Other objects, features, and advantages of the present invention will become apparent from the subsequent description and the appended claims, taken in conjunction with the accompanying drawings, in which:

FIGURE 1 is a plan view of a multiple stage header assembly including a transfer mechanism of the present invention;

FIGURE 2 is a partial sectional view with some parts shown broken away and others shown in section of the multiple stage header assembly of FIGURE 1, taken substantially along the line 2—2 with the male die section shown generally only, and with the header assembly in a condition in which the rams of the male die section have just engaged the workpieces;

FIGURE 3 is a sectional view of the multiple stage header assembly of FIGURE 1 taken substantially along the line 3—3 in FIGURE 1;

FIGURE 4 is a sectional view of the multiple stage header assembly of FIGURE 1, taken substantially along the line 4—4 in FIGURE 3;

FIGURE 5 is a pictorial view of the multiple stage header assembly of FIGURE 1 in an operative condition just succeeding the condition shown in FIGURES 1–4 and in which the rams of the male die section have almost completed their upsetting operations;

FIGURE 6 is a view similar to that of FIGURE 2 but with the multiple stage header assembly in the operative condition shown in FIGURE 5;

FIGURE 7 is a pictorial view similar to the view of FIGURE 5 with the multiple stage header assembly shown in a different operative condition in which the male die section is fully retracted;

FIGURE 8 is a view similar to that of FIGURE 2 but with the multiple stage header assembly in the operative condition shown in FIGURE 7;

FIGURE 9 is a view of a portion of the transfer mechanism taken substantially along the line 9—9 in FIGURE 7; and FIGURE 10 is a pictorial view of a portion of the transfer mechanism of the multiple stage header assembly of FIGURE 1 with the transfer mechanism shown in a position for maintenance or repair.

In general, the multiple stage header assembly of the present invention includes a header subassembly for performing the metal working operations on a plurality of workpieces and a transfer mechanism for moving the workpieces from one heading stage to the next after successive operations. The header subassembly in general has two sections, a female die section in which are located the female die members and a male die section which includes a plurality of rams operative with each of the female die members. In operation, the female die section is maintained stationary while the male die section with the plurality of rams, is reciprocated toward and away from the female die section to perform the various working operations. The transfer mechanism picks up each workpiece after each working operation and moves it to the succeeding stage with the finished workpiece being discharged into some suitable receptacle.

More specifically, and looking to the drawings, a multiple stage header assembly is generally indicated by the numeral 10 and includes a header subassembly having a stationary female die section 12 and a movable male die section 14. The transfer mechanism is mounted upon the female die section 12 and is generally indicated by the numeral 16. The individual workpieces are gripped and moved from one heading stage to the next by means of fingers (to be described in more detail later), which are located on a finger support assembly 18. The finger support assembly 18 is held upon a support plate 20 for horizontal sliding movement by means of a pair of channel members 22 and 24. The support plate 20 is located upon the horizontal upper surface 26 of the stationary female die section 12 and is mounted for selected pivotal movement by means and for a purpose to be later described.

Looking initially to FIGURES 1–5, the transfer mechanism 16 includes a plurality of finger assemblies 28a–28e which are substantially identical and which are used in successively transferring workpieces Wa–We from one to another of a plurality of female dies, indicated by the numerals 30a–30e, which are located in the front vertical face 40 of the female die section 12. The workpieces Wa–We are contemplated to be generally cylindrical in shape; however, depending on female dies 30a–30e other shapes could be accommodated. The finger assemblies 28b–28e are identical and similar to the assembly 28e hence, only the assembly 28e will be described, it being understood that similar parts of the other finger assemblies and their associated parts serving similar function will be given the same number with a different letter subscript.

Looking specifically to the finger assembly 28e, an upper guide block 42e is supported for up-and-down slidable movement between a pair of guide channels 44e and 46e. A pair of elongated finger supports 48e and 50e are pivotally connected at their upper ends to the upper guide block 42e at pivots 52e and 54e, respectively; thus the finger supports 48e and 50e are free to pivot toward and away from each other. The finger supports 48e and 50e are provided with confronting cam surfaces 56e and 58e, respectively, which are located to be engageable with cooperating surfaces on a cam member 60e. As shown in FIGURE 2, the finger supports 48e and 50e are positioned with their cam surfaces 56e and 58e just in contact with the cooperating surfaces on the cam 60e. The cam 60e is fixedly mounted to a backing plate 62 which is fixed from vertical movement. The finger assembly 28e includes a rearwardly, horizontally extending adjustment plate 64e which is fixed to the upper end of the guide block 42e. The adjustment plate 64e serves a purpose to be described; it is sufficient for the present to understand that it is through the interaction of the adjustment plate 64e that vertical up-and-down motion of the finger assembly 28e is effectuated.

The finger assemblies 28a–28e are shown in their vertically lowermost positions. As the finger assembly 28e is moved vertically upwardly, the finger supports 48e and 50e are pivoted away from each other about the pivots 52e and 54e, respectively, as the cam surfaces 56e and 58e are moved over the corresponding surfaces on the stationary cam member 60e. The finger assembly 28e further includes a pair of fingers 66e and 68e which are secured to the lower end of the finger supports 48e and 50e, respectively. The right-hand finger 66e is provided with a generally V-shaped notch 70e while the left-hand finger 68e is maintained generally straight. The notch 70e helps to grip the cylindrical workpiece as it is ejected from the die and, as in FIGURE 2, is provided such as to position the gripped workpiece directly in front of the opening of that next female die 38e at which work is to be done upon that workpiece.

The fingers 66e and 68e are provided with transversely extending cuts or grooves 72e and 74e, respectively, which provide weakened sections at which the fingers can be readily broken in case of an obstruction occurring. For example, assuming that a workpiece is not properly ejected from the female die and that the fingers 66e and 68e have gripped this workpiece, in attempting to move the workpiece, some portion of the transfer mechanism 16 most certainly would be damaged or broken. The fingers 66e and 68e are of a relatively inexpensive construction and easily replaceable and hence are provided with the cuts or grooves 72e and 74e whereby in the event of an obstruction, one of the fingers will be broken rather than some part which is more difficult and more costly to replace. All of the finger assemblies 28b through 28e are alike. The finger assembly 28a is similar to the remaining finger assemblies but differs only in the arrangement of the fingers in that it is provided with no left-hand finger and is provided with a right-hand finger 68a which is constructed to have a generally straight surface similar to the left-hand finger 68e of the finger assembly 28e. The finger assembly 28a cooperates with a stock cutoff member 76 which functions in a manner to be described.

A front face plate 78 is generally fixed to the backing plate 62 and is provided with a plurality of cutouts 80a through 80e, etc., which permit access for the cam members 58a through 58e and generally restrains the finger supports, similar to the supports 48e and 50e, from swinging outwardly away from the associated dies 28a–28e. The finger supports, similar to the supports 48e and 50e, are resiliently urged in a direction into engagement with the cams, such as cams 60e by means of a plurality of spring assemblies such as spring assembly 82, which are located between adjacent finger supports of the finger assemblies 28a and 28b, 28b and 28c, 28c and 28d, and 28d and 28e. Individual spring assemblies such as spring assembly 84 are connected to the two outermost finger supports 48e and 50a to urge them towards their associated cams.

Considering the sequence of operations and looking initially to FIGURE 2, the transfer mechanism 16 is shown in a position holding the workpieces Wa–We in front of the associated female dies 28a–28e just at engagement by the associated rams or headers from the male die section 14. In accordance with the sequence of selected operations, the workpiece Wa would have just been cut off from stock and would have had no operations performed upon it; the workpiece Wb would have just been removed from the female die 38a and hence would have had the first upsetting operation performed thereon; the workpiece Wc would have just been re- moved from the female die 28b and hence would have had the second upsetting operation performed thereupon and so on with the remainder of the workpieces Wc, Wd, and We. As the associated rams engage the workpieces Wa–We and move them into the associated female dies 30a–30e the transfer mechanism 16 is actuated such that the finger assemblies 28a to 28e are moved upward vertically and out of the way as shown in FIGURE 6. On completion of the work stroke, the movable male die section 14 is retracted and is moved rearwardly. As this occurs, the finger support assembly 18 is moved horizontally to the left as viewed in FIGURES 1 and 2, with the finger assemblies 28a–28e still in the raised position. As the retraction of the male die section 14 continues, the finger assemblies 28a–28e are moved vertically downwardly to positions in front of the female dies 38a–38e, as shown in FIGURE 8. In this position you will note that the finger assemblies 38a–38e have now been indexed one die position to the left, with the finger assembly 28b in line with the female die 38a, 28c with 38b, 28d with 38c and 28e with 38d. Note that there is no finger assembly in front of the female die 38e and note that the finger assembly 28a is now located in front of a stock feeding aperture 86. As the workpieces are ejected from the dies 28a–28d, they are gripped by the finger assemblies 28b–28e, respectively. The workpiece being ejected from the die 38e can be caught by a suitable receptacle since it has completed the desired number of operations. Note that while five female die stages 38a–38e are shown, more or less die stages could be utilized, depending upon the operations to be performed.

The material utilized is in the form of a wire stock and is fed through the stock feed aperture 86. The proper amount of wire is regulated by means of a stock stop assembly 88 which has an adjustable member 90 which can be selectively positioned a selected distance from the aperture 86 such that an amount of wire stock will be fed through the aperture 86 until the adjustable member 90 is engaged; thus the amount of stock protruding beyond the surface of the aperture 86 will be controlled by the distance of the adjustable member 90 from that surface. In this position the stock cutoff member 76 which has a generally semicircular shaped cutting edge 93 is located in clearance relationship with the stock feed aperture 86. Note that with the apparatus as shown in FIGURE 8, the apparatus is in condition to repeat the sequence of operations previously described. Thus as the male die section 14 is moved forwardly toward the female die section 12, the finger support assembly 18 is moved horizontally whereby each of the finger assemblies 28a–28e are located in the positions as shown in FIGURE 2. At the same time, the stock cutoff member 76 is moved into engagement with the protruding portion of stock out of the stock aperture 86 and hence the proper amount of stock is sheared off and is gripped with the finger 68a associated with the finger assembly 28a.

Note that the stock stop assembly 88 is connected to a horizontally reciprocable bar, as is the stock cutoff member 76 and hence is moved horizontally along with the stock cutoff member 76. In this regard, the adjustable member 90 is located in the upper end of an upper arm portion of a pivot arm 92 of the stock stop assembly 88 which arm 92 is centrally pivoted by fastener means 94. A lower arm portion of pivot arm 92 is provided with a cam roller 96 which is rotatably fixed thereto. The lower arm portion of the pivot arm 92 is connected to a fixed block structure 98 by means of a spring 100. The spring 100 is connected to the fixed block structure member 98 such as to normally maintain the arm 92 in its upright position as shown in FIGURE 8. However, the fixed block member 98 is provided with a cam surface 102 which has an abrupt rise section such that as the bar 104, to which the stock stop assembly 88 is secured, is moved horizontally to the right, as viewed in FIGURE 8, the cam roller 96 is moved upwardly abruptly along the cam surface 102, causing the arm 92 to pivot whereby the upper arm portion having the adjustable member 90 is pivoted downwardly from its location in front of the stock feed aperture 86 and hence out of position from the rams associated with the male die section 12. As the bar 104 is moved to the left to occupy the position as shown in FIGURE 8, the stock stop assembly 88 is likewise moved to the left and the arm member 92 is then caused to pivot in a counterclockwise direction whereby the upper arm portion is pivoted upwardly whereby the adjustable member 90 is located in front of the stock feed aperture 86.

Note that with the apparatus thus far shown and described, the finger assemblies 28a–28e are moved vertically out of the path of the rams of the male die section 14 as the work stroke is completed. Because of the clearance with the rams provided by this vertical movement it is not necessary that the various fingers be pivoted away and towards each other any substantial extent; thus for a given application, the fingers and dies can be located more proximate to each other and hence a more compact assembly can be provided. In this regard it should be noted that the present invention possesses a marked advantage over past structures in which the fingers are not moved vertically and hence must be pivoted a substantial extent to provide clearance for the male die.

The horizontal motion of the finger support assembly 18 is provided by means of the forward and reverse movement of the male die section 14. Hence, the bar 104 is supported on the female die section 12 for horizontal reciprocating motion only and is provided with a horizontal cam roller assembly 106. Connected to the male die section 12 is a cam bar 108 which is reciprocable along with the male die section 14 and is provided with a cam groove 110 in which is located the cam roller assembly 106. The cam groove 110 is provided with a forward straight section 112 and a rearward straight section 114, which are horizontally offset and are connected by an angulated center section 116. Considering the position of the apparatus as shown in FIGURE 1, the cam roller assembly 106, and hence the bar 104 has been moved horizontally to its extreme right-hand position in accordance with the forward movement of the male die section 14, and as the male die section 14 is moved rearwardly, the cam bar 108 is moved rearwardly, hence moving the cam groove 110 rearwardly. Initially, the rearward movement results in no horizontal movement of the bar 104 since the cam roller assembly 106 is in the straight portion 114. However, as the angulated center portion 116 is moved into the position of the cam roller assembly 106, the bar 104 is moved horizontally to the left until the cam roller assembly 106 is located within the straight portion 12 of the cam groove 110. Upon movement of the male die section 14 in a direction towards the female die section 12, horizontal movement of the bar 104 in the opposite direction occurs. Fixed to the bar 104 is an upright support plate 118 which has pivotally secured to its upper end a crank arm 120 which is also connected to the finger support assembly 18. Thus, as the bar 104 is reciprocated horizontally, the finger support assembly 18 is likewise reciprocated horizontally through the connection of the crank arm 120. Of course, as the finger support assembly 18 is reciprocated to its various positions horizontally, the finger assemblies 28a–28e are moved vertically in the sequence previously described. This is accomplished by the apparatus to be presently described.

Connected to the male die section 14, is a vertical cam assembly 122 (see FIGURES 5 and 7) which comprises an upper cam track member 124 and a lower cam track member 126. Associated with the vertical cam assembly 122 is a cam roller assembly 128 which is rotatably supported upon a crank arm 130 which is in an assembly secured to the female die section 12 and to be described in detail later.

Considering now the apparatus first generally in the position as shown in FIGURE 2, the male die section 14 will be located at a position at which the rams are just about to engage the workpieces Wa–We. In this position the horizontal cam roller assembly 106 will be located generally in the position as shown in FIGURE 1. At this time the vertical cam roller assembly 128, and hence the crank arm 130, is located in its lowermost position in engagement with a straight lower cam surface 127 on the lower cam track 126. In this condition, the finger assemblies 28a–28e are shown in FIGURE 2. As the rams engage the workpieces Wa–We, the roller assembly 128 contacts an upwardly inclined lower cam surface 136 thereby moving the cam roller assembly 128 and hence the pivot arm 130 generally upwardly which motion (see FIGURE 5) causes movement (through apparatus to be described) of the finger assemblies 28a–28e to move upwardly, thereby releasing the workpieces Wa–We and also moves the finger assemblies 28a–28e out of the path of the associated rams on the male die section 14. On completion of the upsetting operations, the male die section 14 is moved rearwardly at which time the roller assembly 128, and hence arm 130, is maintained in its upper position and moves along a straight upper cam surface 132 on the upper cam track 124 and hence the finger assemblies 28a–28e are maintained in their vertically raised or upper positions, as shown in FIGURE 6. As the rearward movement of the male die section 14 continues, the roller assembly 128 is moved into contact with a downwardly extending cam surface portion 134 on the upper cam track 124 whereby the arm 130 is moved downwardly and hence the finger assemblies 28a–28e are moved downwardly, as shown in FIGURE 8. Note that while the cam roller assembly 128 is moving along the straight upper cam surface 132, the horizontal cam mechanism has moved the finger support assembly 18 horizontally to the left, and hence as the cam roller assembly 128 (and the arm 130) moves downwardly upon engagement with the downwardly inclined cam surface 134, the apparatus assumes the position as shown in FIGURES 7 and 8.

The apparatus interconnecting the cam roller assembly 128 and crank arm 130 with the finger assemblies 28a–28e will next be considered. The opposite end of the pivot arm 130 is connected to a shaft 138 which is journaled in a journal assembly 140, which is supported upon a support plate 142, which in turn is supported upon the horizontal surface 26. Fixed to the shaft 138 is an outwardly extending arm structure 144 which has secured to its outer end a double roller assembly 146 which comprises a generally U-shaped bracket 148 having a roller 150 in one leg and a roller 152 in the other leg. The U-shaped bracket 148 is pivotally secured to the forward end of the arm 144 at the upper roller 150. Thus, as the cam roller assembly 148 is moved up and down and hence as the crank arm 130 is pivoted up and down, the shaft 138 is rotated thereby causing pivotal movement of the arm 144 and hence of the roller assembly 146 (see FIGURE 3).

The double roller assembly 146 cooperates with an assembly which includes another journal assembly 154. The journal assembly 154 rotatably supports a pivot arm 158 substantially at its center. The rear portion 160 of the pivot arm 158 extends between the rollers 150 and 152 of the roller assembly 146, while the forward portion 162 is located proximate to the rearward side of the backing plate 62. The journal assembly 154 is a portion of the finger support assembly 18 and moves horizontally therewith. To compensate for the horizontal reciprocation the rearward portion 160 is provided to be of a width sufficient such that regardless of the horizontal position of the finger support assembly 18 and hence of the pivot arm 158, the portion 160 will always be located in between the rollers 150 and 152 and hence actuable thereby. A second double roller assembly 164 is similar to the double roller assembly 146 and has an upper roller 166 and a lower roller 168 pivotally secured to a U-shaped bracket 170 with the assembly 164 pivotally secured to the forward portion 162 of the pivot arm 158 at the lower roller 168.

Fixed to the upper surface of the support plate 20 are a pair of vertically extending post assemblies 170 and 172, each having vertically extending and vertically movable posts 174 and 176, respectively. Secured to the posts 174 and 176 is an actuating bar 178 which extends between the rollers 166 and 168 such that as the pivot arm 158 is pivoted and the roller assembly 164 is moved up and down, the connecting bar 178 is similarly moved up and down along with the rods 174 and 176. Secured to the upper ends of the rods 174 and 176 is an upper actuating bar member 180. The upper actuating bar 180 cooperates with the adjustment plates 64a–64e, in a manner to be described, to move the finger assemblies 28a–28e up and down. Since the adjustment plates 64a–64e are all identical, only the construction of one, plate 64a, and its cooperation with the actuating bar 180 will be described.

Looking now to FIGURE 9, a bolt member 182a passes through a clearance hole through the adjustment plate 64a and is threadably engaged with the upper actuating bar 180. A normally compressed spring 184a is located on the bolt 182a and exerts a compressive force between the head of bolt 182a and the bar 180 and hence urges the adjustment plate 64a downwardly towards the actuating bar 180. However, a positioning bar 186 is fixed to the rear surface of the rear plate 62 and is located near the upper edge thereof generally beneath the adjustment plates 64a–64e. A stud member 188a is threadably located in a bore through the adjustment plate 64a with its lower end engaging the positioning bar 186. A lock nut 190a is provided to lock the adjusting stud 188a in the selected position. As can be seen from the drawings, the position of the adjusting stud 188a will determine the lowermost position of the finger assemblies 28a–28e and hence each of the assemblies 28a–28e can be precisely adjusted to have their fingers located directly in front of the apertures of the associated female dies 30a–30e. It can be appreciated that there can be dimensional variations between the different sets of finger assemblies 28a–28e and hence such a structure, as previously described, permits individual adjustment to compensate for these variations. Thus, as the pivot arm 158 is pivoted so that the forward portion 162 is moved upwardly, the connecting bars 178 and 180, and hence the posts 174 and 176, are moved upwardly until the connecting bar 180 engages the lower surfaces of the adjustment plates 64a–64e wherewith further upward movement each of the finger assemblies 28a–28e are moved upwardly. Note that along with the permissible adjustments of the individual assemblies 28a–28e as provided by the studs such as stud 188a corresponding compensating adjustments can be made in the individual cam members 58a–58e.

In order to facilitate the repair or maintenance of the transfer mechanism 16 as shown and described, it is constructed such that the various parts can be made easily accessible. Thus, the support plate 20 is pivotally secured at its rearward end by a pair of pivot assemblies 192 and 194; likewise, the support plate 142 is pivoted at its rearward end by means of a pivot assembly 196. Thus to service or provide maintenance of the transfer mechanism 16 it is necessary first to disassemble the vertical cam assembly 122 and to disconnect the crank arm 120. Next, the support plate 142 and the associated apparatus supported thereon can be pivoted rearwardly via the pivot structure 196 into a position as shown in FIGURE 10, whereupon the remaining part of the transfer mechanism 16 can be pivoted rearwardly by means of pivoting the support plate 20 rearwardly about the hinge assemblies 192 and 194 into the position as shown in FIGURE 10. With the transfer mechanism 16 in the position as shown in FIGURE 10, the finger assemblies 28a–30a can be readily reached for servicing.

Note that the mounting plate 20 is held down to the upper horizontal surface 26 of the female die section 12 resiliently at its forward end by means of a bolt 200 which extends through a through bore in the plate 20 and is threadably engageable with a threaded bore extending through the upper horizontal surface 26 of the female die section 12. A coil spring member 202 is precompressed between the head of bolt 200 and an enlarged washer 204, which is located in clearance relationship over the stud 200 such as to normally maintain the support plate 20 against the surface 26. However, the spring 202 will permit some upward pivotal movement such that, in the event of engagement of one of the finger assemblies 28a–28e with a workpiece which has not been properly ejected and which is lodged partially within the associated female die member such as to cause breakage of the associated finger, as this breakage occurs, the plate 20 will pivot upwardly. A microswitch assembly 206 is located proximate the front end of the support plate 20 and is connected to the main switch for actuating the multiple stage header assembly 10 such that as the plate 20 pivots as a result of breakage the switch assembly 206 will be actuated to deenergize the main switch whereby operation of the multiple stage header assembly 10 will be interrupted before any additional damage can occur.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A transfer mechanism for transferring work-pieces from one work station to another in a multiple stage die, comprising: a plurality of finger assembly means actuable to one condition for gripping the workpieces and to another condition for releasing the workpieces, first means for moving said plurality of finger assembly means back and forth between a pair of work stations along a first path in a plane, second means for moving said plurality of finger assembly means translationally towards and away from the work stations along a second path in said plane transversely to said first path in said plane, and actuating means for actuating said finger assembly means to said one condition as said second means moves said plurality of finger assemblies towards the work stations along said second path and to said other condition as said second means moves said plurality of finger assemblies away from the work stations along said second path, said actuating means including a fixed cam member and cam surfaces on said finger assembly means.

2. A transfer mechanism for transferring workpieces from one work station to another in a multiple stage die, comprising: a plurality of finger assembly means actuable to one condition for gripping the workpieces and to another condition for releasing the workpieces, at least some of said finger assembly means including a pair of fingers for gripping the workpieces and means for supporting said fingers for pivotal movement towards and away from each other, first means for moving said plurality of finger assembly means back and forth between a pair of work stations along a first path in a plane, second means for moving said plurality of finger assembly means translationally towards and away from the work stations along a second path in said plane transversely to said first path in said plane, and actuating means for actuating said finger assembly means to said one condition as said second means moves said plurality of finger assemblies towards the work stations along said second path and to said other condition as said second means moves said plurality of finger assemblies away from the work stations along said second path, said actuating means including a fixed cam member and cam surfaces on said finger assembly means.

3. A transfer mechanism for transferring workpieces from one work station to another in a multiple stage die, comprising: a plurality of finger assembly means actuable to one condition for gripping the workpieces and to another condition for releasing the workpieces, at least some of said finger assembly means including a pair of fingers for gripping the workpieces and means for supporting said fingers for pivotal movement towards and away from each other, first means for moving said plurality of finger assembly means back and forth between a pair of work stations along a first path in a plane, second means for moving said plurality of finger assembly means translationally towards and away from the work stations along a second path in a plane generally transversely to said first path, each of said fingers being replaceable and having a weakened section at which said each of said fingers can be broken as a result of engaging an obstruction as said finger assembly means move along said first path, and means for actuating said finger assembly means to said one condition as said second means moves said plurality of finger assemblies towards the work stations along said second path and to said other condition as said second means moves said plurality of finger assemblies away from the work stations along said second path.

4. A transfer mechanism for transferring workpieces from one work station to another in a multiple stage die, comprising: a plurality of finger assembly means actuable to one condition for gripping the workpieces and to another condition for releasing the workpieces, first means for moving said plurality of finger assembly means back and forth between a pair of work stations along a first path in a plane, second means for moving said plurality of finger assembly means translationally towards and away from the work stations along a second path in a plane generally transversely to said first path, and means for actuating said finger assembly means to said one condition as said second means moves said plurality of finger assemblies towards the work stations along said second path and to said other condition as said second means moves said plurality of finger assemblies away from the work stations along said second path, means responsive to said finger assembly means engaging an obstruction in movement along said first path for interrupting the operation of the multiple stage die.

5. In a multiple stage die assembly having a male die section and a female die section movable relatively towards and away from each other for performing selected operations upon a plurality of workpieces, a transfer mechanism for transferring the workpieces from one work station on the female die section to another; said transfer mechanism comprising; a plurality of finger assembly means actuable to one condition for gripping the workpieces and to another condition for releasing the workpieces, first means for moving said plurality of finger assembly means back and forth between a pair of work stations along a first path in a plane responsively to the relative movement between the male and female die sections, second means for moving said plurality of finger assembly means translationally towards and away from the work stations along a second path in said plane transversely to said first path in said plane responsively to the relative movement between the male and female die sections, and actuating means for actuating said finger assembly means to said one condition as said second means moves said plurality of finger assemblies towards the work stations and to said other condition as said second means moves said plurality of finger assemblies away from the work stations, said actuating means including a fixed cam member and cam surfaces on said finger assembly means.

6. In a multi-stage die assembly having a male die section having a plurality of male dies and a female die section having a plurality of female dies with the die sections being movable relatively towards each other for performing selected operations upon a plurality of workpieces and being movable relatively away from each other after performing the selected operations, a transfer mechanism for transferring workpieces from one female die to another; said transfer mechanism comprising: a plurality of finger assembly means actuable to one condition for gripping the workpieces and to another condition for releasing the workpieces, first means for moving said plurality of finger assembly means back and forth between a pair of female dies along a first path in a plane; second means for moving said plurality of finger assembly means translationally towards the female dies along a second path in said plane transversely to said first path in said plane responsively to relative movement of the male and female die section away from each other and for moving said plurality of finger assembly means translationally away from the female dies to a position out of the path of the male dies along said second path responsively to relative movement of the male and female die sections toward each other, and actuating means for actuating said finger assembly means to said one condition as said second means moves said plurality of finger assemblies towards the female dies and to said other condition as said second means moves said plurality of finger assemblies away from the female dies, said actuating means including a fixed cam member and cam surfaces on said finger assembly means, at least some of said finger assembly means including a pair of fingers and means for supporting said fingers for pivotal movement toward each other to grip the workpiece and away from each other to release the workpieces.

7. A transfer mechanism for transferring workpieces from one work station to another in a multiple stage die, comprising: a plurality of finger assembly means actuable to one condition for gripping the workpieces and to another condition for releasing the workpieces, at least some of said finger assembly means including a pair of fingers for gripping the workpieces and means for supporting said fingers for pivotal movement towards and away from each other, first means for moving said plurality of finger assembly means back and forth between a pair of work stations along a first path in a plane, second means for moving said plurality of finger assembly means translationally towards and away from the work stations along a second path in said plane transversely to said first path in said plane, means for actuating said finger assembly means to said one condition as said second means moves said plurality of finger assemblies towards the work stations along said second path and to said other condition as said second means moves said plurality of finger assemblies away from the work stations along said second path, and means movable along said first path and including a stock cut off member for cutting off selected amounts of material from a supply of material for new workpieces in response to movement of said member along said first path, one of said finger assembly means having a finger located proximate to said member for gripping with said member the new workpieces as they are cut off from the supply.

8. A transfer mechanism for transferring workpieces from one work station to another in a multiple stage die, comprising: a plurality of finger assembly means actuable to one condition for gripping the workpieces and to another condition for releasing the workpieces, first means for moving said plurality of finger assembly means back and forth between a pair of work stations along a first path in a plane, second means for moving said plurality of finger assembly means translationally towards and away from the work stations along a second path in said plane transversely to said first path in said plane, and means for actuating said finger assembly means to said one condition as said second means moves said plurality of finger assemblies towards the work stations along said second path and to said other condition as said second means moves said plurality of finger assemblies away from the work stations along said second path, said first means including a support assembly supported for movement generally along said first path and having a locating bar, said finger assembly means including a guide block, a pair of elongated finger supports pivotally secured at one end to one end of said guide block for pivotal movement towards and away from each other, a pair of fingers secured to said one end of said pair of finger supports, and an adjustment assembly secured to said one end of said guide block and having an adjustable member engageable with said locating bar and selectively movable for positioning said fingers to selected positions along said second path and in front of the work stations with said finger assembly means at its extreme position towards the work station, said second means including guide means secured to said support assembly for guiding said guide block for movement along said second path.

9. A transfer mechanism for transferring workpieces from one work station to another in a multiple stage die, comprising: a plurality of finger assembly means actuable to one condition for gripping the workpieces and to another condition for releasing the workpieces, first means for moving said plurality of finger assembly means back and forth between a pair of work stations along a first path in a plane, second means for moving said plurality of finger assembly means translationally towards and away from the work stations along a second path in said plane transversely to said first path in said plane, and means for actuating said finger assembly means to said one condition as said second means moves said plurality of finger assemblies towards the work stations along said second path and to said other condition as said second means moves said plurality of finger assemblies away from the work stations along said second path, said finger assembly means including a guide block, a pair of elongated finger supports pivotally secured at one end to said one end of said guide block for pivotal movement towards and away from each other and a pair of fingers secured to said one end of said pair of finger supports, said second means including guide means for guiding said guide block for movement along said second path.

10. A transfer mechanism for transferring workpieces from one work station to another in a multiple stage die, comprising: a plurality of finger assembly means actuable to one condition for gripping the workpieces and to another condition for releasing the workpieces, first means for moving said plurality of finger assembly means back and forth between a pair of work stations along a first path in a plane, second means for moving said plurality of finger assembly means translationally towards and away from the work stations along a second path in said plane transversely to said first path in said plane, and means for actuating said finger assembly means to said one condition as said second means moves said plurality of finger assemblies towards the work stations along said second path and to said other condition as said second means moves said plurality of finger assemblies away from the work stations along said second path, said first means including a support assembly supported for movement generally along said first path, said finger assembly means including a guide block, a pair of elongated finger supports pivotally secured at one end to one end of said guide block for pivotal movement towards and away from each other, and a pair of fingers secured to said one end of said pair of finger supports, said second means including guide means secured to said support assembly for guiding said guide block for movement along said second path, and a cam member fixed to said support assembly between each of said pair of finger supports and in a position for engaging said cam surfaces for pivoting said finger supports away from each other as said finger assembly means is moved along said second path away from the work stations and for pivoting said finger supports toward each other as said finger assembly means is moved along said second path toward the work stations.

11. A transfer mechanism for transferring workpieces from one work station to another in a multiple stage die, comprising: a plurality of finger assembly means actuable to one condition for gripping the workpieces and to another condition for releasing the workpieces, first means for moving said plurality of finger assembly means back and forth between a pair of work stations along a first path in a plane, second means for moving said plurality of finger assembly means translationally towards and away from the work stations along a second path in said plane transversely to said first path in said plane, and means for actuating said finger assembly means to said one condition as said second means moves said plurality of finger assemblies towards the work stations along said second path and to said other condition as said second means moves said plurality of finger assemblies away from the work stations along said second path, said first means including a support assembly supported for movement generally along said first path, said finger assembly means including a guide block, a pair of elongated finger supports pivotally secured at one end to one end of said guide block for pivotal movement towards and away from each other, and a pair of fingers secured to said one end of said pair of finger supports, said second means including guide means secured to said support assembly for guiding said guide block for movement along said second path, and a cam member fixed to said support assembly between each of said pair of finger supports and in a position for engaging said cam surfaces for pivoting said finger supports away from each other as said finger assembly means is moved along said second path away from the work stations and for pivoting said finger supports toward each other as said finger assembly means is moved along said second path toward the work stations, means movable along said first path and including a stock cut off member for cutting off selected amounts of material from a supply of material for new workpieces in response to movement of said member along said first path, one of said finger assembly means having a finger located proximate to said member for gripping with said member the new workpieces as they are cut off from the supply.

12. In a multi-stage die assembly having a male die section having a plurality of male dies and a female die section having a plurality of female dies with the die sections being movable relatively towards each other for performing selected operations upon a plurality of workpieces and being movable relatively away from each other after performing the selected operations, a transfer mechanism for transferring workpieces from one female die to another; said transfer mechanism comprising: a plurality of finger assembly means actuable to one condition for gripping the workpieces and to another condition for releasing the workpieces, first means for moving said plurality of finger assembly means back and forth between a pair of female dies along a first path in a plane; second means for moving said plurality of finger assembly means translationally toward the female dies along a second path in said plane transversely to said first path in said plane responsively to relative movement of the male and female die sections away from each other and for moving said plurality of finger assembly means translationally away from the female dies to a position out of the path of the male dies along said second path responsively to relative movement of the male and female die sections toward each other, means for actuating said finger assembly means to said one condition as said second means moves said plurality of finger assemblies towards the female dies and to said other condition as said second means moves said plurality of finger assemblies away from the female dies, said first means including a support plate for supporting said plurality of said finger assembly means on the female die section, and means for hingedly connecting said support plate to the female die section for pivotal movement about a hinge axis away from the female die whereby repair of said plurality of said finger assembly means is facilitated.

13. A transfer mechanism for transferring workpieces from one work station to another in a multiple stage die, comprising: a plurality of finger assembly means actuable to one condition for gripping the workpieces and to another condition for releasing the workpieces, first means for moving said plurality of finger assembly means back and forth between a pair of work stations along a first path in a plane, second means for moving said plurality of finger assembly means translationally towards and away from the work stations along a second path in said plane transversely to said first path in said plane, and means for actuating said finger assembly means to said one condition as said second means moves said plurality of finger assemblies towards the work stations along said second path and to said other condition as said second means moves said plurality of finger assemblies away from the work stations along said second path, said first means including a support assembly supported for movement generally along said first path and having a locating bar, said finger assembly means including a guide block, a pair of elongated finger supports pivotally secured at one end to one end of said guide block for pivotal movement towards and away from each other, a pair of fingers secured to said one end of said pair of finger supports and an adjustment assembly secured to said one end of said guide block and having an adjustable member engageable with said locating bar and selectively movable for positioning said fingers to selected positions along said second path and in front of the work station with said finger assembly means at its extreme position towards the work station, said second means including guide means secured to said support assembly for guiding said guide block for movement along said second path, and a cam member fixed to said support assembly between each of said pair of finger supports and in a position for engaging said cam surfaces for pivoting said finger supports away from each other as said finger assembly means is moved along said second path away from the work stations and for pivoting said finger supports toward each other as said finger assembly means is moved along said second path toward the work stations.

14. A transfer mechanism for transferring workpieces from one work station to another in a multiple stage die, comprising: a plurality of finger assembly means actuable to one condition for gripping the workpieces and to another condition for releasing the workpieces, first means for moving said plurality of finger assembly means back and forth between a pair of work stations along a first path in a plane, second means for moving said plurality of finger assembly means translationally towards and away from the work stations along a second path in said plane transversely to said first path in said plane, and means for actuating said finger assembly means to said one condition as said second means moves said plurality of finger assemblies towards the work stations along said second path and to said other condition as said second means moves said plurality of finger assemblies away from the work stations along said second path, said first means including a support assembly supported for movement generally along said first path and having a locating bar, said finger assembly means including a guide block, a pair of elongated finger supports pivotally secured at one end to one end of said guide block for pivotal movement towards and away from each other, a pair of fingers secured to said one end of said pair of finger supports and an adjustment assembly secured to said one end of said guide block and having an adjustable member engageable with said locating bar and selectively movable for positioning said fingers to selected positions along said second path and in front of the work station with said finger assembly means at its extreme position towards the work station, said second means including guide means secured to said support assembly for guiding said guide block for movement along said second path, and a cam member fixed to said support assembly between each of said pair of finger supports and in a position for engaging said cam surfaces for pivoting said finger supports away from each other as said finger assembly means is moved along said second path away from the work stations and for pivoting said finger supports toward each other as said finger assembly means is moved along said second path toward the work stations, said second means comprising a shaft, means for journalling the shaft for rotation, an arm secured to said shaft and extending radially outwardly therefrom, a generally U-shaped bracket having a pair of parallelly extending leg portions, each of a pair of rollers located on each of said leg portions with said pair of rollers being spaced a selected distance, said U-shaped bracket being pivotally mounted to said arm at one of said rollers, and means locatable between said pair of rollers and connected to said finger assembly means for moving said finger assembly means translationally along said second path responsively to pivotal movement of said shaft and hence of said arm.

15. A pivot assembly for pivoting a member mounted for pivotal movement comprising; a shaft, means for journalling the shaft for rotation, an arm secured to said shaft and extending radially outwardly therefrom, a generally U-shaped bracket having a pair of parallelly extending leg portions, and each of a pair of rollers located in each of said leg portions with said pair of rollers being spaced a selected distance for receiving the member, said U-shaped bracket being pivotally mounted to said arm at one of said rollers.

References Cited

UNITED STATES PATENTS

| | | | |
|---|---|---|---|
| 1,982,460 | 11/1934 | Wilcox | 10—12 |
| 3,154,801 | 11/1964 | Byam | 10—12 |
| 3,165,766 | 1/1965 | Wisebaker | 10—12 |
| 2,020,658 | 11/1935 | Frost | 10—12 |

GERALD A. DOST, *Primary Examiner.*